3,071,574
N-(TRISAMINO-PHOSPHORANYLIDENE)-HALOACYLAMIDES

Harry F. Brust, Midland, Mich., assignor to The Dow Chemical Company, Midland, Mich., a corporation of Delaware
No Drawing. Filed June 30, 1961, Ser. No. 120,910
7 Claims. (Cl. 260—239)

The present invention is directed to N-(trisamino-phosphoranylidene)-haloacylamides corresponding to the formula $$R-N=P(R')_3$$

In this and succeeding formulae, R represents halolower-alkanoyl and each R' represents amino, loweralkyl amino or 1-azirkdinyl. The expressions "loweralkyl" and "loweralkanoyl" are employed in the present specification and claims to refer to radicals containing from 1–5 carbon atoms, inclusive. These novel compounds are crystalline solid materials which are somewhat soluble in many common organic solvents and of low solubility in water. The compounds are useful as parasiticides and herbicides and are adapted to be employed for the control of a number of plant, mite, insect, Helminth, bacterial and fungal organisms such as ticks, aphids, beetles, worms, grubs, Salvinia and millet.

The compounds of the present invention are prepared by reacting a halo-loweralkanoyl phosphorimidic trichloride corresponding with the formula $$R-N=P\begin{array}{c}Cl\\ -Cl\\ Cl\end{array}$$

with an amine compound having the formula R'H, with a mixture of two or more of such amine compounds or successively with two or more of said amine compounds. The reaction is carried out in the presence of an acid binding agent such as a tertiary amine or an excess of the employed amine compound or compounds, and conveniently in an organic liquid such as diethyl ether, benzene, toluene, carbon tetrachloride and methylene dichloride. Good results are obtained when employing one molecular proportion of the halo-loweralkanoyl phosphorimidic trichloride with about 3 molecular proportions of the acid binding agent and about 3 molecular proportions of one of the amine compounds or a total of about 3 molecular proportions of 2 or more of the amine compounds. Thus, for example, when it is desired to produce a mixed product, one molecular proportion of the phosphorimidic trichloride and about 3 molecular proportions of acid binding agent can be employed with one molecular proportion of each of three amine compounds, about 1½ molecular proportions of each of two amine compounds, or about one molecular proportion of one amine compound and about 2 molecular proportions of another amine compound. The reaction takes place smoothly at the temperature range of from −40° to 50° C. with the production of the desired product and chloride of reaction. This chloride appears in the reaction mixture as the chloride salt of the binding agent.

In carrying out the reaction, the reactants and acid binding agent are contacted together in any convenient fashion and maintained for a period of time in the reaction temperature range to complete the reaction. Thus, for example, the halo-loweralkanoyl phosphorimidic trichloride is contacted with one of the amine reagent compounds or successively with two, three or more of the amine compounds in the presence of a corresponding amount of the employed amine compound or compounds, or in the presence of a tertiary amine such as pyridine or triethylamine. In an alternative procedure, the phosphorimidic trichloride is contacted with a mixture of two, three or more of the amine compounds and in the presence of a tertiary amine as acid binding agent. Following the completion of the reaction, the reaction mixture may be filtered and the reaction medium removed by distillation or evaporation under reduced pressure to obtain the desired product as a residue. This product can be purified by conventional procedures such as washing with water and suitable organic solvents, and recrystallization.

The following examples merely illustrate the invention and are not to be construed as limiting:

*Example 1.—N-[Tris(Methylamino)Phosphoranylidene]-2,2,2-Trichloroacetamide*

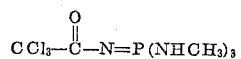

Methylamine (38 grams; 1.22 moles) was dissolved in 200 milliliters of diethyl ether and the resulting mixture added portionwise to about 2 moles of trichloroacetylphosphorimidic trichloride. The addition was carried out at a temperature of −30° C. and over a period of 45 minutes. The reaction mixture was then allowed to warm to about 10° C., the reaction medium removed by evaporation and the residue successively washed with water to obtain an N-[tris(methylamino)phosphoranylidene]-2,2,2-trichloroacetamide product as a crystalline solid. This product was recrystallized from ethanol and found to melt at 128°–129° C. and have chlorine and phosphorous contents of 37 percent and 11.5 percent, respectively as compared to theoretical contents of 37.8 percent and 11.02 percent.

*Example 2.—N-[Tris(1-Aziridinyl)Phosphoranylidene]-2,2,2-Trichloroacetamide*

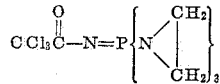

Trichloroacetylphosphorimidic trichloride (29.8 grams; 0.1 mole) was added solely portionwise to 12.9 grams (0.3 mole) of ethyleneimine and 30.3 grams (0.3 mole) of triethylamine dispersed in 200 milliliters of diethyl ether. The addition was carried out over a period of two hours and at a temperature of from 0°–5° C. The reaction mixture was then set aside at room temperature for 16 hours and the reaction medium thereafter removed by evaporation to obtain an N-[tris(1-aziridinyl)phosphoranylidene]-2,2,2-trichloroacetamide product as a crystalline residue. This product was recrystallized from a petroleum distillate boiling at from 30°–60° C. and found to melt at 63°–63.5° C., and having chlorine, phosphorus and nitrogen contents of 33.5 percent, 9.9 percent and 17.46 percent, respectively as compared to theoretical contents of 33.5 percent, 9.77 percent and 17.7 percent.

In a similar manner, other products of the present invention are prepared as follows:

N-[tris(methylamino)phosphoranylidene]-2,2-dichloropropionamide (molecular weight of 261; phosphorus content of 13.0 percent) by reacting together the 2,2-dichloropropionylphosphorimidic trichloride and methylamine.

N-[tris(methylamino)phosphoranylidene]-2,2,3-trichloropropionamide (melting at 88° C.; chlorine content of 35.95) by reacting together 2,2,3-trichloropropionylphosphorimidic trichloride and methylamine.

N-[tris(1-aziridinyl) phosphoranylidene]-2,2-dichlorobutyramide (molecular weight of 311; chlorine content of 23.1 percent) by reacting together 2,2-dichlorobutyrylphosphorimidic trichloride and ethyleneimine.

N-[tris(ethylamino)phosphoranylidene]-2,2,3-trichlorovaleramide (molecular weight of 365; chlorine content of 29 percent) by reacting together 2,2,3-trichlorovalerylphosphorimidic trichloride and ethylamine.

N - [tris(propylamino)phosphoranylidene] - 2,2,3 - trichloropropionamide (melting at 85°–86° C.; phosphorus content of 8.17 percent) by reacting together 2,2,3-trichloropropionylphosphorimidic trichloride and propylamine.

N - [tris(butylamino)phosphoranylidene] - bromoacetamide (molecular weight of 382; bromine content of 20.5 percent) by reacting together bromoacetylphosphorimidic trichloride and butylamine.

N-[tris(methylamino)phosphoranylidene]-2,2-dibromopropionamide (melting at 111°–113° C.; bromine content of 22.5 percent) by reacting together 2,2-dibromopropionylphosphorimidic trichloride and methylamine.

N - [tris(1-aziridinyl)phosphoranylidene]-2,2-dibromopropionamide (molecular weight of 382; phosphorus content of 8.3 percent) by reacting together 2,2-dibromopropionylphosphorimidic trichloride and ethyleneimine.

N - [bis(methylamino)-1-aziridinylphosphoranylidene]-2-chlorobutyramide (molecular weight of 250; phosphorus content of 12 percent) by reacting 2-chlorobutyrylphosphorimidic trichloride successively with ethyleneimine and methylamine.

N- (methyltriaminophosphoranylidene)-2,2-dichlorovaleramide (molecular weight of 260; phosphorus content of 12 percent) by reacting together 2,2-dichlorovalerylphosphorimidic trichloride, methylamine and ammonia in the presence of triethylamine.

N - [tris(dimethylamino)phosphoranylidene] - 2,2 - dichloroacetamide (molecular weight of 249; phosphorus content of 12.7 percent) by reacting together 2,2-dichloroacetylphosphorimidic trichloride and dimethylamine.

N - [tris(amylamino)phosphoranylidene]-2,3-dichloropropionamide (molecular weight of 430; phosphorus content 7.2 percent) by reacting together 2,3-dichloropropionylphosphorimidic trichloride and amylamine.

The compounds of the present invention are useful as parasiticides and herbicides for the control of a number of pests. For such uses, the products are dispersed on a finely divided solid such as chalk or talc or a finely divided solid surface active dispersing agent and the resulting products employed as dusts. Such mixtures may be dispersed in water with or without the addition of surface active dispersing agents and the resulting aqueous suspensions employed as sprays. In other procedures, the products are employed as active constituents in solvent solutions, oil-in-water or water-in-oil emulsions or aqueous dispersions. In representative operations, aqueous compositions containing 500 parts per million by weight of N-[tris(1-aziridinyl)phosphoranilidene] - 2,2,2 - trichloroacetamide give 100 percent controls of round worms and Coontail.

The haloalkanoylphosphorimidic trichlorides employed as starting materials in accordance with the teachings of the present invention are prepared by known procedures wherein a suitable haloalkanoylamide is reacted with phosphorus pentachloride ($PCl_5$). The reaction takes place readily at temperatures of from 40°–70° C. and conveniently is carried out in an organic solvent as reaction medium. Upon completion of the reaction, the desired starting product is separated by conventional procedures.

I claim:

1. A compound corresponding to the formula $$R—N=P(R')_3$$

wherein R represents halo-loweralkanoyl and each R' represents a member of the group consisting of amino, loweralkyl amino and 1-aziridinyl.

2. N - [tris(methylamino)phosphoranylidene]-2,2,2-trichloroacetamide.

3. N - [tris(1-aziridinyl)phosphoranylidene] - 2,2,2-trichloroacetamide.

4. N - [tris(methylamino)phosphoranylidene] - 2,2-dichloropropionamide.

5. N - [tris(methylamino)phosphoranylidene]-2,2,3-trichloropropionamide.

6. N - [tris(propylamino)phosphoranylidene] -2,2,3-trichloropropionamide.

7. N - [tris(methylamino)phosphoranylidene] - 2,2-dibromopropionamide.

No references cited.